US012494315B2

(12) United States Patent
Guo et al.

(10) Patent No.: US 12,494,315 B2
(45) Date of Patent: Dec. 9, 2025

(54) NONLINEAR INDUCTOR, MANUFACTURING METHOD THEREOF, AND NONLINEAR INDUCTOR ROW

(71) Applicant: Shenzhen Sunlord Electronics Co., Ltd., Guangdong (CN)

(72) Inventors: Hai Guo, Guangdong (CN); Shengcheng Xia, Guangdong (CN); Qintian Hou, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 915 days.

(21) Appl. No.: 17/714,167

(22) Filed: Apr. 6, 2022

(65) Prior Publication Data

US 2023/0215612 A1 Jul. 6, 2023

Related U.S. Application Data

(63) Continuation of application No. PCT/CN2021/142812, filed on Dec. 30, 2021.

(51) Int. Cl.
*H01F 27/02* (2006.01)
*H01F 27/26* (2006.01)
(Continued)

(52) U.S. Cl.
CPC ......... *H01F 27/022* (2013.01); *H01F 27/266* (2013.01); *H01F 27/29* (2013.01); *H01F 41/0246* (2013.01); *H01F 41/04* (2013.01)

(58) Field of Classification Search
CPC ...... H01F 27/022; H01F 27/266; H01F 27/29; H01F 41/0246; H01F 27/306;
(Continued)

(56) References Cited

U.S. PATENT DOCUMENTS 6,927,660 B2 * 8/2005 Okamoto .............. H01F 27/292 336/208
2009/0128277 A1 * 5/2009 Moiseev ................. H01F 30/06 336/170
(Continued)

FOREIGN PATENT DOCUMENTS

CN 105914008 A 8/2016
CN 107017080 8/2017
(Continued)

*Primary Examiner* — Shawki S Ismail
*Assistant Examiner* — Kazi S Hossain
(74) *Attorney, Agent, or Firm* — Winston Hsu

(57) ABSTRACT

Disclosed is a nonlinear inductor, a manufacturing method thereof, and a nonlinear inductor row. The nonlinear inductor includes two magnetic core assemblies, a conductor and a magnetic plastic encapsulation layer; the magnetic core assemblies include magnetic cores; each magnetic core includes a flange and a central column arranged on the flange; two central columns of the two magnetic core assemblies are opposite to each other; a non-uniform air gap exists between the two central columns and/or the magnetic core assemblies are made of different materials; the conductor is arranged on the two central columns; the two magnetic core assemblies and the conductor are located in the magnetic plastic encapsulation layer; electrode parts of the conductor are exposed outside the magnetic plastic encapsulation layer; and the magnetic core assemblies and the magnetic plastic encapsulation layer are made of different materials; thereby the nonlinear inductor has stepped saturation characteristics.

16 Claims, 13 Drawing Sheets

(51) Int. Cl.
*H01F 27/29* (2006.01)
*H01F 41/02* (2006.01)
*H01F 41/04* (2006.01)

(58) Field of Classification Search
CPC ...... H01F 2003/106; H01F 41/04; H01F 3/10; H01F 3/14; H01F 27/2847; H01F 38/023; H01F 27/263; H01F 41/005; H01F 41/0206
USPC ............................................. 336/90, 221, 83
See application file for complete search history.

(56) References Cited

U.S. PATENT DOCUMENTS

| | | | | |
|---|---|---|---|---|
| 2010/0060999 | A1* | 3/2010 | Higuchi | H01F 5/00 359/814 |
| 2019/0131050 | A1 | 5/2019 | Danesh Pajooh Nejad | |
| 2019/0208624 | A1* | 7/2019 | Coteus | H01F 27/28 |
| 2020/0350109 | A1 | 11/2020 | Dubois | |

FOREIGN PATENT DOCUMENTS

| | | | |
|---|---|---|---|
| CN | 112216472 | A | 1/2021 |
| CN | 113593843 | A | 11/2021 |
| JP | 2021-197503 | | 12/2021 |

* cited by examiner

NONLINEAR INDUCTOR, MANUFACTURING METHOD THEREOF, AND NONLINEAR INDUCTOR ROW

CROSS REFERENCE TO RELATED APPLICATIONS

This application is a continuation application of PCT Application No. PCT/CN2021/142812, filed on Dec. 30, 2021. The content of the application is incorporated herein by reference.

BACKGROUND OF THE INVENTION

1. Field of the Invention

The present application relates to an inductor, in particular to a nonlinear inductor, a manufacturing method thereof, and a nonlinear inductor row.

2. Description of the Prior Art

In switching power converters, in order to improve the operation stability of a circuit under light load conditions, when the light load current is small, a power inductor needs to have large enough inductance to enable the circuit to work in a continuous or critical mode, and at the same time, when the heavy load current is large, sharp drop in inductance needs to be avoided. In order to meet this characteristic, a nonlinear inductor needs to be used, that is, the inductor needs to meet a larger inductance under light load, with the continuous increase of the current, the inductance decreases accordingly, and in the case of a certain inductance volume, the inductor can meet the required inductance in the entire load range from light load to heavy load.

Under the condition of a certain inductance volume of the existing nonlinear inductor, if the inductance value is larger, then more coil turns are needed, a wire diameter is smaller, the resistance value is larger, the temperature rise current of a product is smaller, and the saturation current is smaller. An inductor with small saturation current can satisfy a higher inductance value under light load, but when the heavy load current is large, the inductance will decrease or even fail. At the same time, small temperature rise current will make the inductor unable to work under large current.

The disclosure of the above background contents is only used to assist in understanding the inventive concept and the technical solution of the present application, and does not necessarily belong to the prior art of the present patent application. If there is no clear evidence that the above contents have been disclosed before the application date of the present patent application, the above background should not be used to evaluate the novelty and inventiveness of the present application.

SUMMARY OF THE INVENTION

The main purpose of the present application is to overcome the defects of the above background to provide a nonlinear inductor, a manufacturing method thereof, and a nonlinear inductor row, so as to optimize the saturation characteristics and the initial inductance.

To achieve the above purpose, the present application adopts the following technical solution:

A nonlinear inductor includes two magnetic core assemblies, a conductor and a magnetic plastic encapsulation layer; where the magnetic core assemblies include magnetic cores; each magnetic core includes a flange and a central column arranged on the flange; two central columns of the two magnetic core assemblies are opposite to each other; a non-uniform air gap exists between the two central columns and/or the magnetic core assemblies are made of different materials; the conductor is arranged on the two central columns; the two magnetic core assemblies and the conductor are located in the magnetic plastic encapsulation layer; electrode parts of the conductor are exposed outside the magnetic plastic encapsulation layer; and the magnetic core assemblies and the magnetic plastic encapsulation layer are made of different materials; thereby the nonlinear inductor has stepped saturation characteristics.

Preferably, each magnetic core assembly further includes a lug boss; the lug boss is arranged on the central column; and steps are arranged between the flange and the central column and between the lug boss and the central column.

Preferably, each magnetic core assembly further includes a magnetic rod; the magnetic core has a groove; the magnetic rod is fixed in the groove; and the materials of the magnetic rod and the magnetic core are different.

Preferably, each magnetic core assembly further includes a T-shaped magnetic sheet; the magnetic core has a T-shaped groove; the shape of the T-shaped groove is matched with the T-shaped groove; the T-shaped groove passes through the central column and the flange; the T-shaped magnetic sheet is fixed in the T-shaped groove; and the materials of the T-shaped magnetic sheet and the magnetic core are different.

Preferably, the conductor is a hollow coil which includes a coil body and electrode parts respectively arranged at both ends of the coil body; and the coil body is fixed on the central columns of the two magnetic cores.

Preferably, the conductor is a metal terminal which includes a base part, two bent parts connected with the base part, two electrode parts connected with the two bent parts respectively, and two widened parts connected with the base part; each of the two bent parts extends downward from two opposite sides of the base part; the two electrode parts are respectively arranged at one end of the two bent parts away from the base part; each of the two widened parts extends outwards from other two opposite sides of the base part and is flush with the base part; the middle region of the base part is also provided with a terminal hole; the top of the flange has a flange groove for matching the widened parts; and the bottom of the flange has an electrode groove for placing the electrode parts.

Preferably, both sides of the widened parts are further provided with first clamping parts; both sides of the flange groove are provided with second clamping parts matched with the first clamping parts; one of the first clamping parts and the second clamping parts is a clamping groove, and the other is a bump; and the metal terminal and the magnetic cores are fixed through matching and clamping of the first clamping parts and the second clamping parts.

Preferably, the metal terminal is integrally formed from red copper plates by stamping, electroplating, cutting and bending.

A manufacturing method of the nonlinear inductor includes the following steps: S1, assembling two magnetic core assemblies and a conductor to form an assembly; S2, coating the assembly with a magnetic material through a compression molding technology, and exposing the electrode parts of the conductor; S3, under preset molding pressure and preset baking temperature, solidifying the magnetic material to form a magnetic plastic encapsulation layer, so as to coat the two magnetic core assemblies and parts of the conductor except for the electrode parts into the magnetic plastic encapsulation layer, and expose the electrode parts of the conductor outside the magnetic plastic encapsulation layer.

A nonlinear inductor row is formed by combining the nonlinear inductors.

The present application has the following beneficial effects:

In the nonlinear inductor provided by the present application, the magnetic core assemblies with the central columns with the non-uniform air gap and/or the magnetic core assemblies made of different materials are used, so that the nonlinear inductor has stepped saturation characteristics (also called multi-segment saturation characteristics). For the magnetic core assemblies with the central columns with the non-uniform air gap, the stepped saturation characteristics mean that with the increase of the current, a place with small air gap is preferentially saturated, and after a certain inductance is reached, as the current continues to increase, a place with large air gap gradually begins to reach a saturation state to form the stepped saturation characteristics. For the magnetic core assemblies made of different materials, the stepped saturation characteristics mean that according to the difference in the saturation magnetic induction intensity of different materials, with the increase of the current, the material with smaller saturation magnetic induction intensity is preferentially saturated. Then, the material with larger saturation magnetic induction intensity gradually reaches saturation as the current increases, thereby forming the stepped saturation characteristics in which one material is preferentially saturated and then the other material is gradually saturated. The advantage of the present application is that under the condition of maintaining the same inductance as the traditional components, the components can still maintain a certain amount of inductance under large current, that is, the present application optimizes the saturation characteristics. Under the same inductance as the traditional components under large current, the initial inductance of the components is higher than that of the traditional components to a certain extent, that is, the initial inductance is optimized. Therefore, compared with the existing nonlinear inductor of the same volume, the nonlinear inductor of the present application has higher initial inductance, smaller resistance value, larger saturation current and larger temperature rise current. Compared with the existing nonlinear inductor with the same inductance characteristics, the volume of the non-linear inductor of the present application is smaller.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
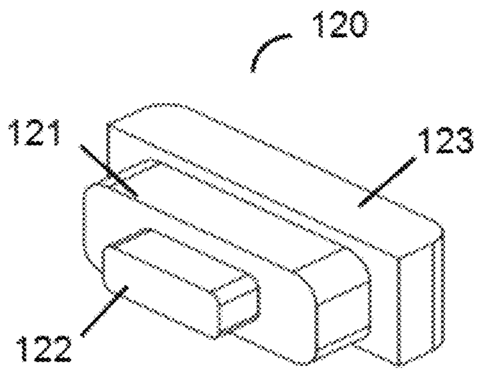
FIG. 1*a* is a structural schematic diagram of a magnetic core assembly 120 in embodiment 1 of the present application.

Embodiments of the present application are described below in detail. It should be emphasized that the following descriptions are merely illustrative and not intended to limit the scope and application of the present application.

It should be noted that when an element is known as "fixed to" or "arranged on" another element, the element can be directly on another element or indirectly on another element. When an element is known as "connected with" another element, the element can be directly connected to another element or indirectly connected to another element. In addition, connection can be used for either fixing or coupling or communicating functions.

It should be understood that terms such as "length", "width", "upper", "lower", "front", "rear", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application.

In addition, the terms such as "first" and "second" are only used for the purpose of description, rather than being understood to indicate or imply relative importance or hint the number of indicated technical features. Thus, the features limited by "first" and "second" can explicitly or impliedly include one or more features. In the description of the embodiments of the present application, the meaning of "a plurality of" is two or more unless otherwise clearly specified.

Embodiments of the present application provide a nonlinear inductor which includes two magnetic core assemblies, a conductor and a magnetic plastic encapsulation layer; the magnetic core assemblies include magnetic cores; each magnetic core includes a flange and a central column arranged on the flange; two central columns of the two magnetic core assemblies are opposite to each other; a non-uniform air gap exists between the two central columns and/or the magnetic core assemblies are made of different materials; the conductor is arranged on the two central columns; the two magnetic core assemblies and the conductor are located in the magnetic plastic encapsulation layer; electrode parts of the conductor are exposed outside the magnetic plastic encapsulation layer; and the magnetic core assemblies and the magnetic plastic encapsulation layer are made of different materials; thereby the nonlinear inductor has stepped saturation characteristics. "The non-uniform air gap exists between the two central columns and/or the magnetic core assemblies are made of different materials" means that: when the non-uniform air gap exists between the two central columns, the magnetic core assemblies can be made of one material, or different materials; and when the magnetic core assemblies are made of different materials, the non-uniform air gap, a uniform air gap, or no air gap can exist between the two central columns.

Embodiments of the present application further provide a manufacturing method of the nonlinear inductor, comprising the following steps:

- S1, assembling two magnetic core assemblies and one conductor to form an assembly;
- S2, coating the assembly with a magnetic material through a compression molding technology, and exposing the electrode parts of the conductors;
- S3, under preset molding pressure and preset baking temperature, solidifying the magnetic material to form a magnetic plastic encapsulation layer, so as to coat the two magnetic core assemblies and parts of the conductors except for the electrode parts into the magnetic plastic encapsulation layer, and expose the electrode parts of the conductors outside the magnetic plastic encapsulation layer.

In a preferred example, the molding pressure is 0-100 MPa. Embodiments of the present application further provide a nonlinear inductor row formed by combining the nonlinear inductors.

The present application will be described in detail below through some embodiments.

Embodiment 1

As shown in FIGS. 1*a*-1*e*, the nonlinear inductor includes two magnetic core assemblies 120, one conductor 110 and one magnetic plastic encapsulation layer 130.

FIG. 1*a* shows a structural schematic diagram of one magnetic core assembly 120. The magnetic core assembly 120 includes a magnetic core and a lug boss 122, where the magnetic core includes a flange 123 and a central column 121; the central column 121 is arranged on the flange 123; the lug boss 122 is arranged on the central column 121; and steps are arranged between the flange 123 and the central column 121 and between the lug boss 122 and the center column 121. That is, the size of the flange 123 is larger than the size of the central column 121, and the size of the central column 121 is larger than the size of the lug boss 122. In this example, preferably, the central column 121 is arranged on the central region of the flange 123, and the lug boss 122 is arranged on the central region of the central column 121. In this example, the number of the lug boss 122 is one, but the present application is not limited thereto, and in other variations, the number of the lug boss 122 may be set to more than one according to actual needs. In this example, the magnetic core assembly is integrally formed from the same material, for example, formed by sintering ferrite, but the material is not limited to ferrite.

Figure 1B:
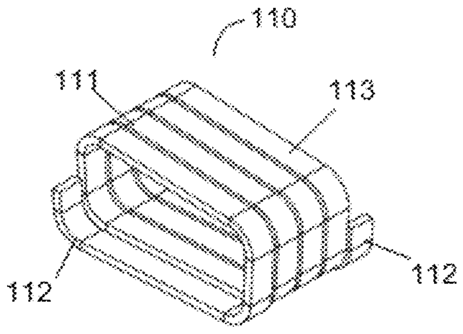
FIG. 1*b* is a structural schematic diagram of a hollow coil 110 in embodiment 1 of the present application.

As shown in FIG. 1*b*, the conductor 110 is a hollow coil, which includes a coil body 113 and electrode parts 112 respectively arranged at both ends of the coil body 113. In this example, the hollow coil 110 is made of enameled copper flat wires wound on a jig of the size equivalent to the central column of the magnetic core to be matched therewith (of course, the hollow coil can also be made of enameled copper flat wires directly wound on the central column of the magnetic core). The hollow coil 110 has only one layer, the coils on both sides are closely attached, and a gap 111 is left in the middle, so that the plastic encapsulation glue is injected into the air gap part of the central column of the magnetic core during subsequent plastic encapsulation.

Figure 1C:
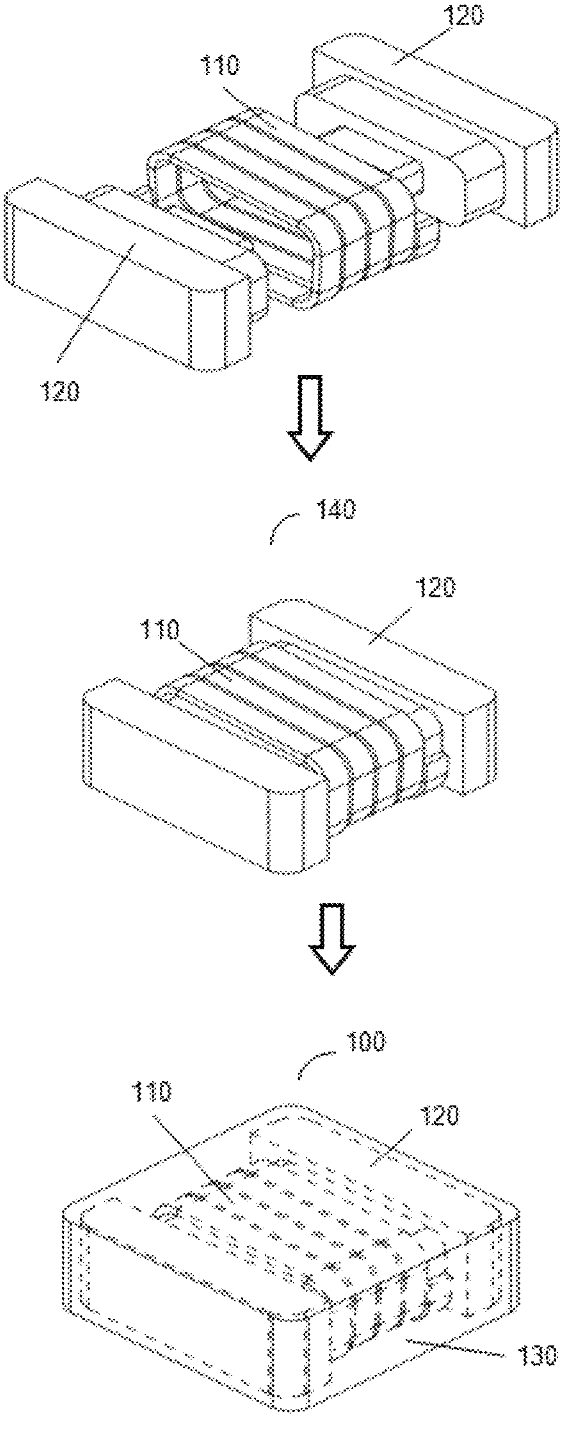
FIG. 1*c* is a schematic diagram of an assembly process of a nonlinear inductor 100 in embodiment 1 of the present application.

FIG. 1*c* shows a schematic diagram of an assembly process of the nonlinear inductor 100. After the central columns of the two magnetic core assemblies 120 are arranged opposite (i.e., face to face), the conductor 110 is assembled on the central columns 121 of the magnetic core assemblies 120. For example, the relative positions of the hollow coil 110 and the magnetic core assemblies 120 can be fixed by epoxy glue to form an assembly 140, and a fitting gap between the hollow coil 110 and the central columns 121 is 20-150 μm, so as to realize automatic assembly. Then, the assembly 140 is transferred to an injection mold frame; and the assembly 140 except for the electrode parts 112 of the hollow coil 110 is coated in a magnetic material by a compression molding technology (in this example, an injection molding technology is specifically adopted) (that is, except for the electrode parts 112 of the hollow coil 110, magnetic material powder fills all the gaps in the assembly 140 and covers the outer surface of the assembly 140). In this example, the magnetic powder contained in the magnetic material is FeSiCr metal soft magnetic powder which is passivated and insulated. The molding pressure is 30 MPa, and the magnetic permeability μi is 20-35. A molded semi-finished product is obtained after demolding. Then, the molded semi-finished product is baked at a temperature of 100° C. and above for 4 hours to solidify the organic components of the magnetic material to form the magnetic plastic encapsulation layer 130 that coats the assembly 140. Since the inductor in this example uses hollow coil leads as the electrode parts 112 of the inductor, the electrode parts 112 also need to be subjected to depainting coating treatment and then electrode metallization treatment to finally obtain the nonlinear inductor 100.

A single-phase stepped saturated molded inductor is obtained in this example. When the two magnetic core assemblies are used together, a non-uniform air gap can be formed between the central columns. When the two magnetic core assemblies 120 are used together, the height of the lug bosses 122 can be adjusted and/or the distance between two lug bosses 122 can be adjusted to regulate the initial inductance and the initial saturation characteristics of the nonlinear inductor; and the distance between the central columns 121 of the two magnetic cores can be adjusted to regulate the inductance after the initial inductance saturation and the secondary saturation characteristics.

Figure 1D:
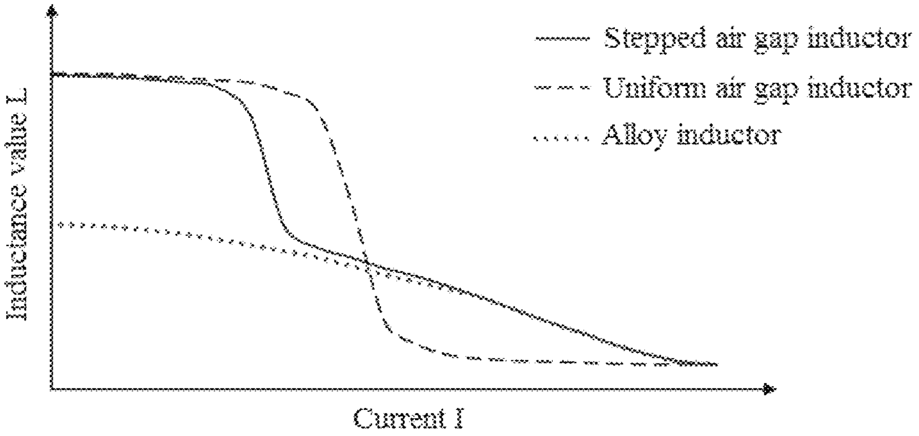
FIG. 1*d* is a schematic diagram of comparison of a saturation characteristic curve of a nonlinear inductor 100 in embodiment 1 of the present application with the saturation characteristic curves of a uniform air gap inductor and an alloy inductor.
Figure 1E:
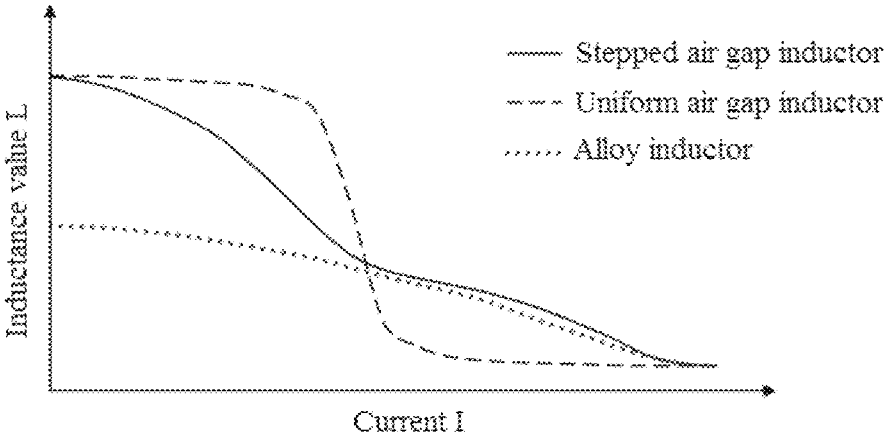
FIG. 1*e* is a schematic diagram of comparison of another saturation characteristic curve of a nonlinear inductor 100 in embodiment 1 of the present application with the saturation characteristic curves of a uniform air gap inductor and an alloy inductor.

In this example, the non-uniform distribution of the air gap between the two magnetic core assemblies is used to control the initial inductance of the inductor and the inductance after adding the saturation current. FIG. 1*d* shows comparison of the saturation characteristic curve of the nonlinear inductor 100 (still having a stepped air gap) when a part of the central columns of the magnetic core has no air gap and the saturation characteristic curves of a uniform air gap inductor (such as, an assembled inductor with a uniform air gap) and an alloy inductor (such as a toroidal inductors, an NR inductor, etc.). FIG. 1*e* shows the comparison of the saturation characteristic curve of the nonlinear inductor 100 (with a stepped air gap) when all the central columns of the magnetic cores have air gaps and the saturation characteristic curves of a uniform air gap inductor (such as an assembled inductor with a uniform air gap) and an alloy inductor (such as a toroidal inductor, an NR inductors, etc.). In FIG. 1*d*, because the magnetic saturation induction intensity (Bs) of the material (ferrite) of the magnetic core assembly is smaller than the magnetic saturation induction intensity of the material of the magnetic plastic encapsulation layer in this example, as the current increases, the magnetic core assembly of the ferrite material is preferentially saturated, and the magnetic plastic encapsulation layer located between the air gaps begins to exhibit soft saturation characteristics as the current continues to increase. In FIG. 1*e*, the magnetic plastic encapsulation layer located at the small air gap first exhibits the soft saturation characteristics, and the magnetic plastic encapsulation layer located at the large air gap begins to exhibit the soft saturation characteristics as the current increases. In FIG. 1*d* and FIG. 1*e*, compared with the inductor with the uniform air gap, the saturation characteristics are better at large current.

Embodiment 2

As shown in FIGS. 2*a*-2*f*, the nonlinear inductor includes two magnetic core assemblies, one conductor 210 and one magnetic plastic encapsulation layer 240, where the magnetic core assemblies include a magnetic core 220 and a magnetic rod 230.

Figure 2A:
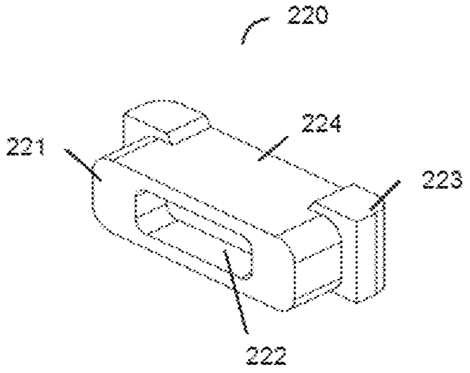
FIGS. 2*a*-2*b* are structural schematic diagrams of a magnetic core 220 in embodiment 2 of the present application.
Figure 2B:
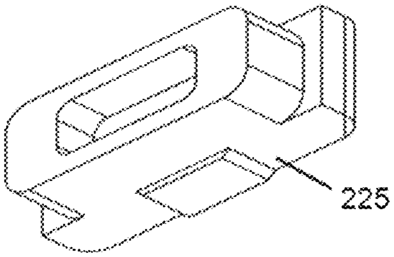
Figure 2C:
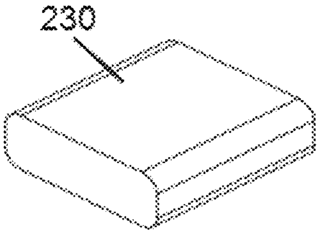
FIG. 2*c* is a structural schematic diagram of a magnetic rod 230 in embodiment 2 of the present application.

FIGS. 2*a*-2*b* show structural schematic diagrams of the magnetic core 220. The magnetic core 220 includes a flange 223, a central column 221 and a groove 222. The central column 221 is arranged on the flange 223. The purpose of arranging the groove is to fix the magnetic rod, and the depth of the groove is not limited. In this example, the groove 222 penetrates through the surface of the central column away from the flange but does not penetrate through the flange 223, but is not limited thereto. In other examples, the groove 222 may also penetrate through the flange. FIG. 2*c* shows a structural schematic diagram of the magnetic rod 230. When the magnetic rod 230 is matched with the magnetic core 220, one end of the magnetic rod 230 is fixed in the groove 222 (for example, the magnetic rod 230 and the groove 222 are fixedly assembled by epoxy glue). The material of the magnetic rod 230 is different from that of the magnetic core 220. For example, the magnetic core 220 is integrally formed and can be formed by sintering ferrite, but the material is not limited to ferrite. The material of the magnetic rod 230 can be iron-nickel or nanocrystalline material, but is not limited to this, as long as the materials of the magnetic rod 230 and the magnetic core 220 are different. In this example, the groove 222 is located in the central region of the central column 221, but the present application is not limited to this. The position of the groove may be at other positions of the central column 221 according to actual needs. Similarly, in this example, the number of the groove 222 is one, but the present application is not limited to this. In other variations, the number of the grooves 222 can be set to more than one according to actual needs. Correspondingly, each groove needs to be matched with one magnetic rod. In this example, the shape of the magnetic rod is like a cube, which is matched with the shape of the groove, but the present application is not limited to this. In other variations, the magnetic rod may also be of other shapes, and may not be matched with the shape of the groove but only need to be fixed in the groove. In this example, referring to FIGS. 2*a* and 2*b*, the top of the flange 223 also has a flange groove 224 for matching with two widened parts 213 of a terminal 210. The bottom of the flange also has an electrode groove 225 for placing the two electrode parts 211 of the terminal 210.

Figure 2D:
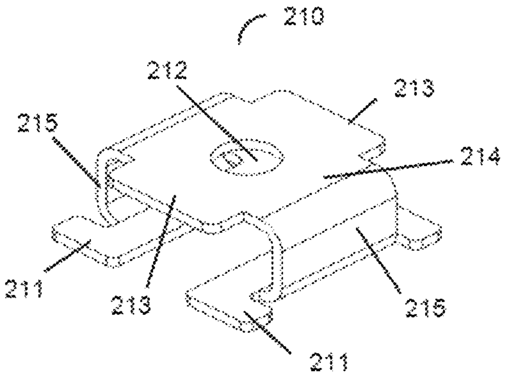
FIG. 2*d* is a structural schematic diagram of a terminal 210 in embodiment 2 of the present application.

FIG. 2*d* shows a structural schematic diagram of the terminal 210. The terminal 210 includes a base part 214, two bent parts 215 connected with the base part 214, two electrode parts 211 connected with the two bent parts 215 respectively, and two widened parts 213 connected with the base part 214. The two bent parts 215 extend downward from two opposite sides of the base part 214 respectively; the two electrode parts 211 are respectively arranged at one end of the two bent parts 215 away from the base part 214; each of the two widened parts 213 extends outwards from other two opposite sides of the base part 214 and is flush with the base part 214; and the middle region of the base part 214 is also provided with a terminal hole 212. The terminal hole 212 corresponds to the air gap between the central columns of the two magnetic cores, so as to ensure that the plastic encapsulation material can fill the air gap between the central columns of the two magnetic cores during plastic encapsulation. The widened parts 213 can compensate for the defects of decrease in terminal sectional area and increase in resistance value caused by the terminal hole 212. The terminal is integrally formed from red copper plates by stamping, electroplating, cutting and bending.

Figure 2E:
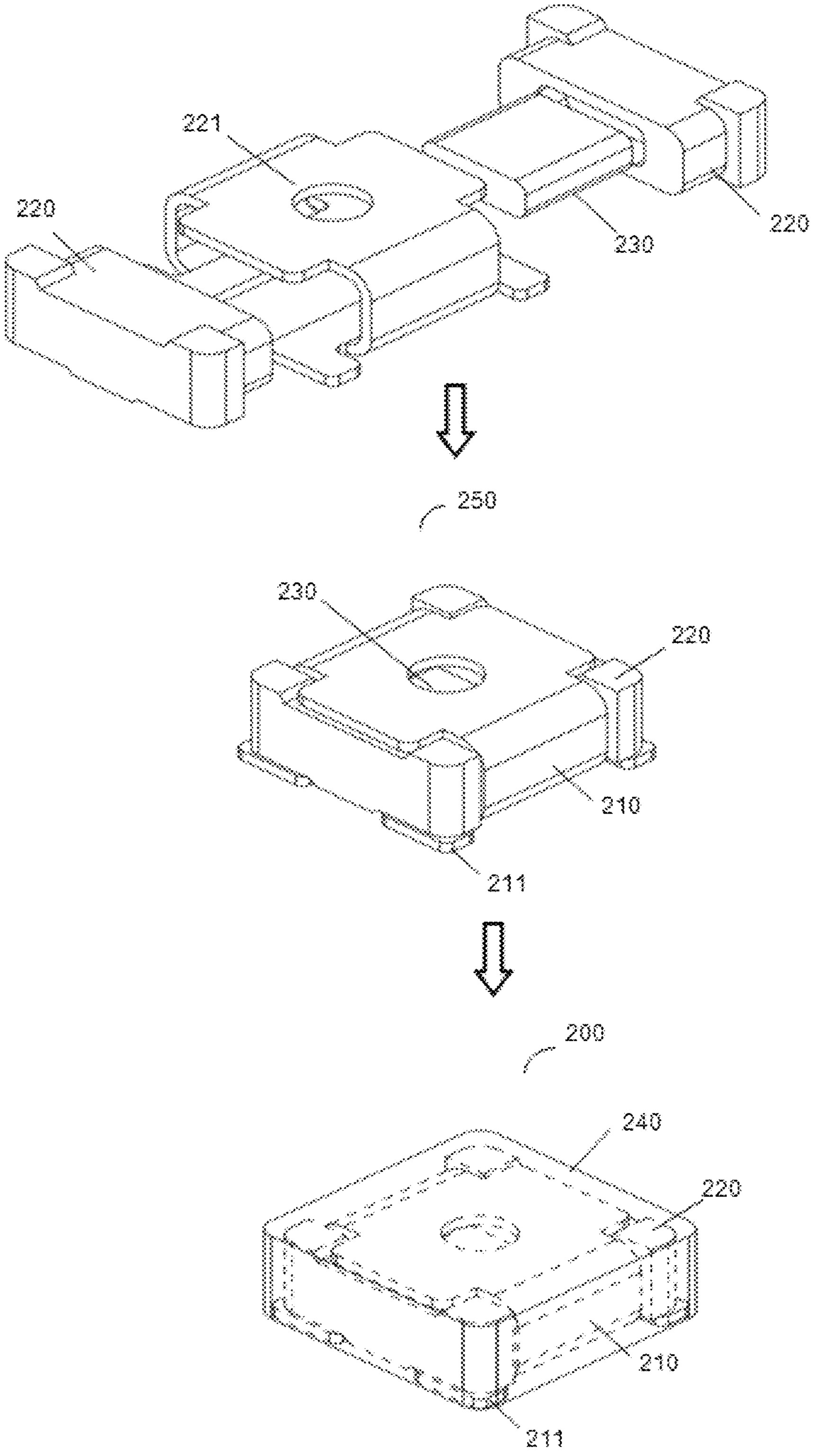
FIG. 2*e* is a schematic diagram of an assembly process of a nonlinear inductor 200 in embodiment 2 of the present application.
Figure 2F:
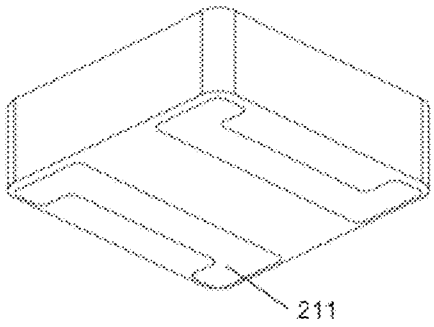
FIG. 2*f* is a structural schematic diagram of a nonlinear inductor 200 from another perspective in embodiment 2 of the present application.

FIG. 2*e* shows a schematic diagram of an assembly process of the nonlinear inductor 200. The magnetic rod 223 is assembled into the groove 222 of the magnetic core 220 (for example, the magnetic core 220 and the magnetic rod 230 can be fixed by epoxy glue). The central columns of the two magnetic cores 220 are arranged opposite to each other, and the terminal 210 is assembled on the central columns 221 of the magnetic cores 220 to form an assembly 250. Then, the assembly 250 is transferred to the injection mold frame, and the assembly 250 except for the electrode parts 211 of the terminal 210 is coated in the magnetic material by the injection molding technology. In this example, the magnetic powder contained in the magnetic material is FeSiCr metal soft magnetic powder which is passivated and insulated. The molding pressure is 30 MPa, and the magnetic permeability μi is 20-35. A molded semi-finished product is obtained after demolding. Then, the molded semi-finished product is baked at a temperature of 100° C. and above for 4 hours to solidify the organic components of the magnetic material to form the magnetic plastic encapsulation layer 240 that coats the assembly. Finally, the nonlinear inductor 200 is obtained. FIG. 2*f* shows a structural schematic diagram of the nonlinear inductor 200 from another perspective. The electrode parts 211 are shown outside the magnetic plastic encapsulation layer 240, and other parts are coated in the magnetic plastic encapsulation layer 240.

A single-phase stepped saturated molded inductor is obtained in this example. Compared with embodiment 1, since the hollow coil 110 is replaced by the terminal 210, the process of removing the enamel coating and electrode metallization can be omitted. In embodiment 1, the entire magnetic core assembly is made of ferrite material, and the initial saturation characteristics are poor. In embodiment 2, the magnetic core assembly is formed by matching the magnetic rod of the iron-nickel or nanocrystalline material with the magnetic core, which can improve the initial saturation characteristics. The initial inductance and initial saturation characteristics of the inductor can be adjusted by adjusting the cross-sectional area of the magnetic rod 230; and the primary saturation inductance and secondary saturation characteristics of the inductor can also be adjusted by adjusting the air gap spacing between the central columns of the two magnetic cores 220.

In embodiment 2, by adding the magnetic rod with a material different from that of the magnetic core on the central column of the magnetic core, a stepped saturation characteristic is formed (one material reaches saturation first, and then the other material reaches saturation. In this example, the magnetic core plastic encapsulation layer between the magnetic cores is saturated first, and then the magnetic rod is saturated), which improves the saturation characteristics of the inductor while increasing the initial inductance.

Embodiment 3

In embodiment 2, the assembly between the magnetic core 220 and the magnetic rod 230 is used to fix the relative positions of the terminal 210, the magnetic core 220 and the magnetic rod 230, which is difficult to realize in automatic assembly. In embodiment 3, the magnetic rod 230 is changed to a T-shaped magnetic sheet 330, and after the T-shaped magnetic sheet 330 and the magnetic core 320 are assembled into a magnetic core assembly 350, the magnetic core assembly 350 and the terminal are assembled, so that automatic assembly is easier to be realized. As shown in FIGS. 3*a*-3*g*, the nonlinear inductor includes two magnetic core assemblies 350, one conductor 310 and one magnetic plastic encapsulation layer 340, where the magnetic core assemblies 350 include a magnetic core 320 and a T-shaped magnetic sheet 330.

Figure 3A:
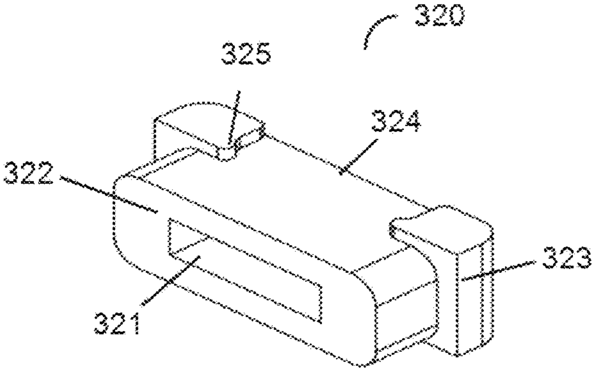
FIGS. 3*a*-3*b* are structural schematic diagrams of a magnetic core 320 in embodiment 3 of the present application.
Figure 3B:
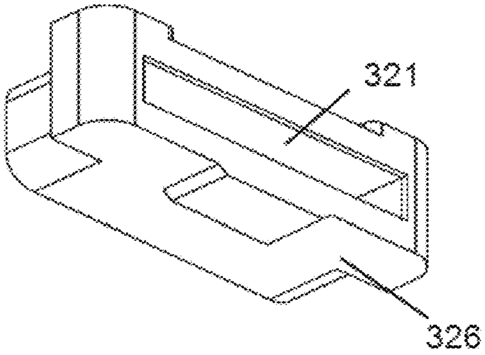
Figure 3C:
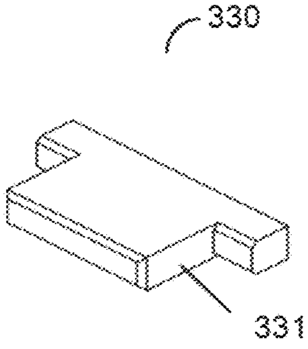
FIG. 3*c* is a structural schematic diagram of a T-shaped magnetic sheet 330 in embodiment 3 of the present application.
Figure 3D:
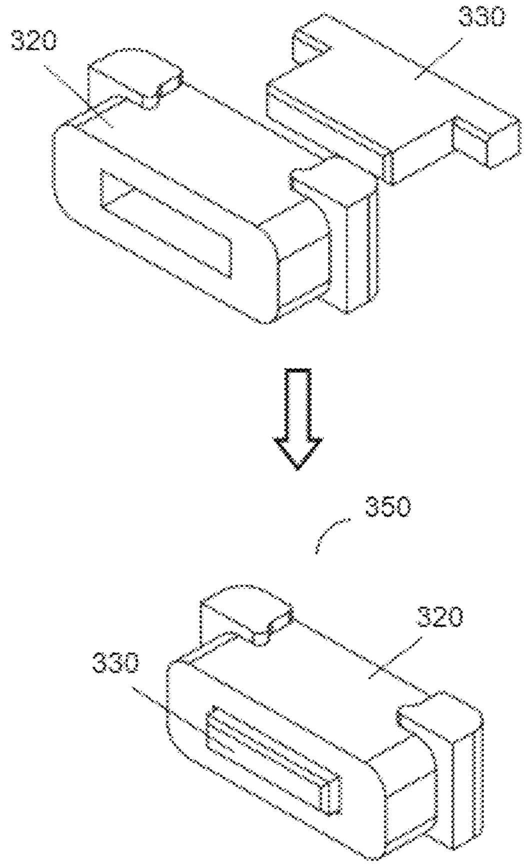
FIG. 3*d* is a flow chart of assembling a T-shaped magnetic sheet 330 and a magnetic core 320 into a magnetic core assembly 350 in embodiment 3 of the present application.
Figure 3E:
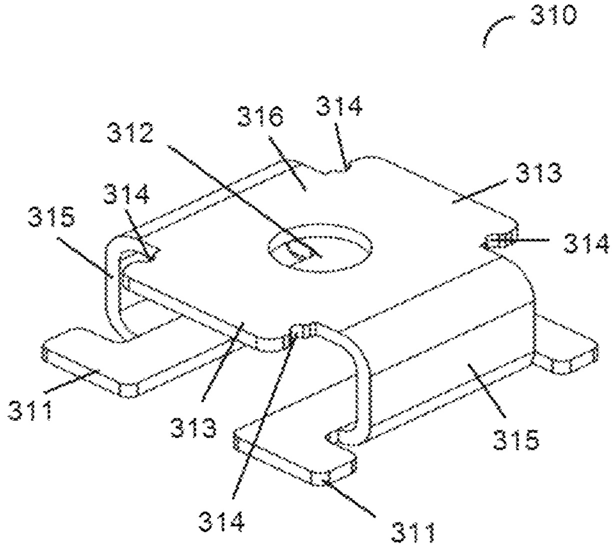
FIG. 3*e* is a structural schematic diagram of a terminal 310 in embodiment 3 of the present application.

FIGS. 3*a*-3*b* show structural schematic diagrams of the magnetic core 320. The magnetic core 320 includes a flange 323, a central column 322 and a T-shaped groove 321. The central column 322 is arranged on the flange 323, and the T-shaped groove 321 penetrates through the central column 322 and the flange 323. FIG. 3*c* shows a structural schematic diagram of the T-shaped magnetic sheet 330. FIG. 3*d* shows a flow chart of assembling the T-shaped magnetic sheet 330 and the magnetic core 320 to form the magnetic core assembly 350. When the T-shaped magnetic sheet 330 is matched with the magnetic core 320, the T-shaped magnetic sheet 330 is fixed in the T-shaped groove 321 (for example, the T-shaped magnetic sheet 330 and the T-shaped groove 321 can be fixedly assembled by epoxy glue). In this example, a magnetic column 331 of the T-shaped magnetic sheet 330 protrudes from the central column 322, but is not limited to this. In other examples, the magnetic column 331 of the T-shaped magnetic sheet 330 may also be flush with or lower than the plane of the central column. The material of the T-shaped magnetic sheet 330 is different from that of the magnetic core 320. For example, the magnetic core 320 is integrally formed and can be formed by sintering ferrite, but the material is not limited to ferrite. The material of the T-shaped magnetic sheet 330 can be iron nickel or nanocrystalline material, but is not limited to this, as long as the materials of the T-shaped magnetic sheet 330 and the magnetic core 320 are different. In this example, the T-shaped groove 321 is located in the central region of the central column 322, but the present application is not limited to this. The position of the T-shaped groove 321 may be at other positions of the central column 322 according to actual needs. Similarly, in this example, the number of the T-shaped groove 321 is one, but the present application is not limited to this. In other variations, the number of the T-shaped grooves 321 can be set to more than one according to actual needs. Accordingly, each T-shaped groove 321 needs to be matched with one T-shaped magnetic sheet. Preferably, in this example, referring to FIGS. 3*a* and 3*b*, the top of the flange 323 further has a flange groove 324 for matching with the two widened parts 313 of the terminal 310, and the bottom of the flange also has an electrode groove 326 for placing the two electrode parts 311 of the terminal 310. Of course, in other examples, the flange grooves and electrode grooves of other shapes may be adopted, or the flange grooves and/or electrode grooves may not be provided according to the structure of the conductor.

Figure 3F:
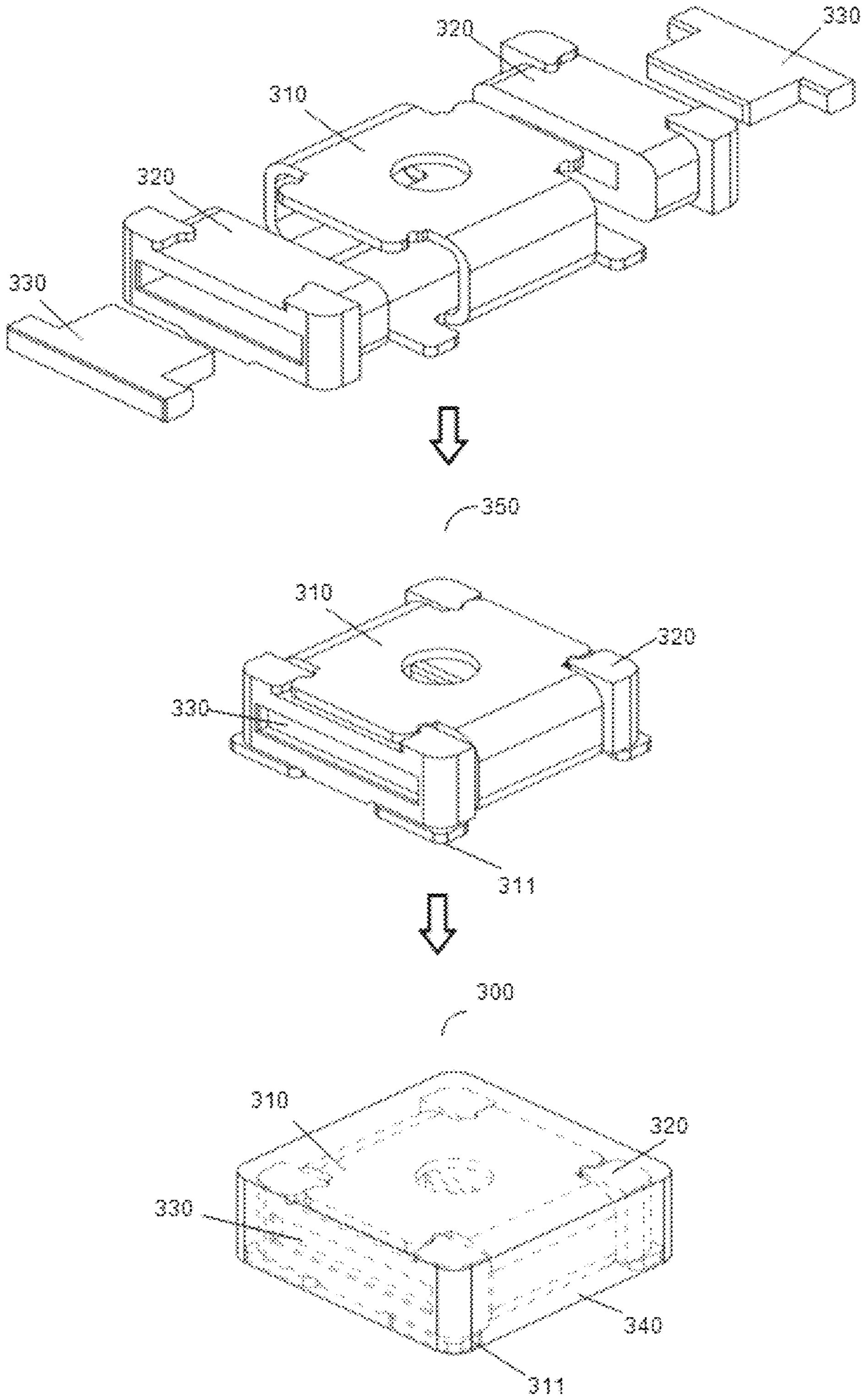
FIG. 3*f* is a schematic diagram of an assembly process of a nonlinear inductor 300 in embodiment 3 of the present application.

FIG. 3*f* shows a structural schematic diagram of the terminal 310. The terminal 310 includes a base part 316, two bent parts 315 connected with the base part 316, two electrode parts 311 connected with the two bent parts 315 respectively, and two widened parts 313 connected with the base part 316. The two bent parts 315 extend downward from two opposite sides of the base part 316 respectively; the two electrode parts 311 are respectively arranged at one end of the two bent parts 315 away from the base part 316; the two widened parts 313 extend outwards from two other opposite sides of the base part 316 and are flush with the base part 316; and the middle region of the base part 316 is also provided with a terminal hole 312. The terminal hole 212 corresponds to the air gap between the central columns of the two magnetic cores, so as to ensure that the plastic encapsulation material can fill the air gap between the central columns of the two magnetic cores during plastic encapsulation. The widened parts 313 can compensate for the defects of decrease in terminal sectional area and increase in resistance value caused by the terminal hole 312. The terminal is integrally formed from red copper plates by stamping, electroplating, cutting and bending. Compared with the terminal 210 in embodiment 2, both sides of the two widened parts 313 of the terminal 310 in this example are provided with first clamping parts. In this example, the first clamping parts are clamping grooves 314 with a number of four, but the present application is not limited to this. Correspondingly, both sides of the flange groove 324 at the top of the flange 323 are provided with second clamping parts matched with the first clamping parts, and in this example, the second clamping parts are bumps 325.

Figure 3G:
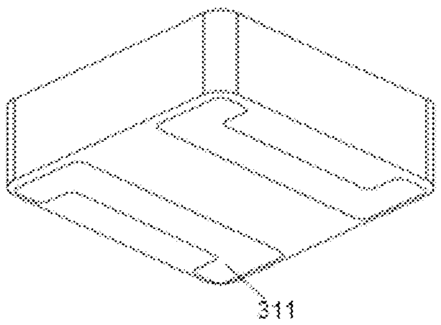
FIG. 3*g* is a structural schematic diagram of a nonlinear inductor 300 from another perspective in embodiment 3 of the present application.

FIG. 3*f* shows a schematic diagram of an assembly process of the nonlinear inductor 300. The T-shaped magnetic sheet 330 is assembled into the T-shaped groove 321 of the magnetic core 320. The central columns of the two magnetic cores 320 are arranged opposite to each other, and the terminal 310 is assembled on the central columns 322 of the magnetic cores 320 to form an assembly 350 (in this example, the terminal 310 and the magnetic cores 320 are fixed through the matching and clamping of the clamping grooves 314 and the bumps 325). Then, the assembly 350 is transferred to the injection mold frame, and the assembly 350 except for the electrode parts 311 of the terminal 310 is coated in the magnetic material by the injection molding technology. In this example, the magnetic powder contained in the magnetic material is FeSiCr metal soft magnetic powder which is passivated and insulated. The molding pressure is 30 MPa, and the magnetic permeability μi is 20-35. A molded semi-finished product is obtained after demolding. Then, the molded semi-finished product is baked at a temperature of 100° C. and above for 4 hours to solidify the organic components of the magnetic material to form the magnetic plastic encapsulation layer 340 that coats the assembly. Finally, the nonlinear inductor 300 is obtained. In this example, a single-phase stepped saturated molded inductor is obtained. FIG. 3*g* shows a structural schematic diagram of the nonlinear inductor 300 from another perspective. The electrode parts 311 are shown outside the magnetic plastic encapsulation layer 340, and other parts are coated in the magnetic plastic encapsulation layer 340.

In the above embodiments 1-3, the sizes and structures of the two magnetic core assemblies in each embodiment are the same, but not limited to this. In other examples, the nonlinear inductor 3 may also adopt magnetic core assemblies of different structures and/or sizes. For example, a magnetic core assembly in embodiment 2 is matched with a magnetic core assembly in embodiment 1 or embodiment 3, and then is matched with the terminal or the hollow coil to form a nonlinear inductor, which also has the stepped saturation characteristics.

As a variation of the above embodiments 1-3, in other examples, the magnetic core assembly 120 of embodiment 1 can also be matched with the terminal 210 in embodiment 2 or the terminal 310 in embodiment 3 to form a nonlinear inductor; and the hollow coil 110 in embodiment 1 can be matched with the magnetic core 220 and the magnetic rod 230 in embodiment 2 to form a magnetic core assembly, or matched with the magnetic core assembly 350 in embodiment 3 to form a nonlinear inductor. Similarly, the terminal 210 of embodiment 2 can be matched with the magnetic core assembly 350 of embodiment 3 to form a nonlinear inductor; and the magnetic core assembly formed by matching magnetic core 220 and the magnetic rod 230 in embodiment 2 can also be matched with the terminal 310 of embodiment 3 to form a nonlinear inductor.

Embodiment 4

Embodiment 4 is a nonlinear inductor row, which is a multiphase stepped saturation molded inductor. As shown in FIGS. 4*a*-4*e*, the nonlinear inductor row includes three terminals 410, two magnetic core assemblies 420 and one magnetic plastic encapsulation layer 430.

Figure 4A:
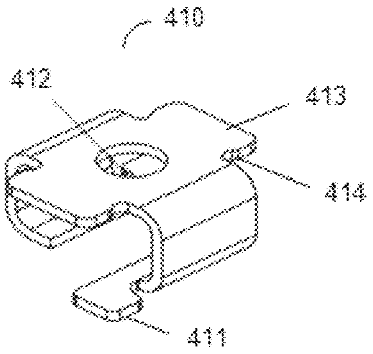
FIG. 4*a* is a structural schematic diagram of a terminal 410 in embodiment 4 of the present application.

FIG. 4*a* shows a structural schematic diagram of the terminal 410. The structure of the terminal 410 is similar to the structure of the terminal 310. Therefore, the structure of the terminal 410 is briefly described as follows: the terminal 410 is integrally formed from red copper plates by stamping, electroplating, cutting and bending. The terminal 410 includes electrode parts 411, a terminal hole 412, a widened part 413 and the like. During plastic encapsulation, the terminal hole 412 can ensure that the plastic encapsulation material can fill the air gap between the central columns of the two magnetic core assemblies 420. The widened part 413 can compensate for the defects of decrease in terminal sectional area and increase in resistance value caused by the terminal hole 412. Both sides of the widened part 413 are provided with clamping grooves 414 for fixing the terminal 410 and the magnetic core assemblies 420 during assembly.

Figure 4B:
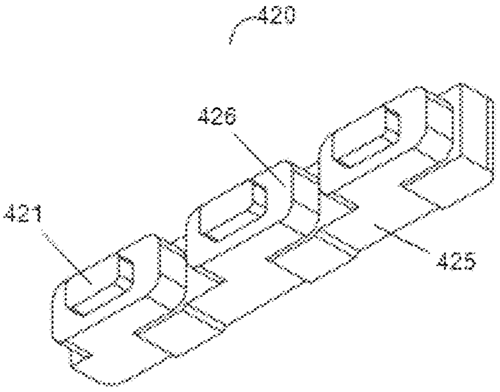
FIGS. 4*b*-4*c* are structural schematic diagrams of a magnetic core assembly 420 in embodiment 4 of the present application.
Figure 4C:
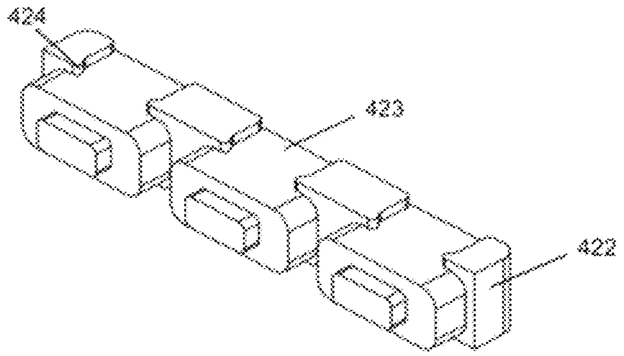

FIGS. 4*b* and 4*c* show structural schematic diagrams of the magnetic core assemblies 420. The magnetic core assemblies 420 are selected from ferrite sintered magnetic cores. The magnetic core assemblies 420 in this example are composed of three magnetic core assembly units, and the structure of each magnetic core assembly unit is similar to the magnetic core assembly in embodiment 1. When assembled into a nonlinear inductor row, each magnetic core assembly unit is configured with one terminal or one hollow coil. In this example, the number of the central columns 426 of the magnetic core assemblies 420 is three, and the number of the lug bosses 421 is also three. The top of the flange 422 is provided with a flange groove 423 for matching with the widened parts 413 on both sides of the top of the terminal. Bumps 424 are arranged on both sides of the flange groove 423 for fixing the position when assembling with the terminal 410. The bottom of the flange 422 is provided with an electrode groove 425 for placing the electrode parts 411 of the terminal.

Figure 4D:
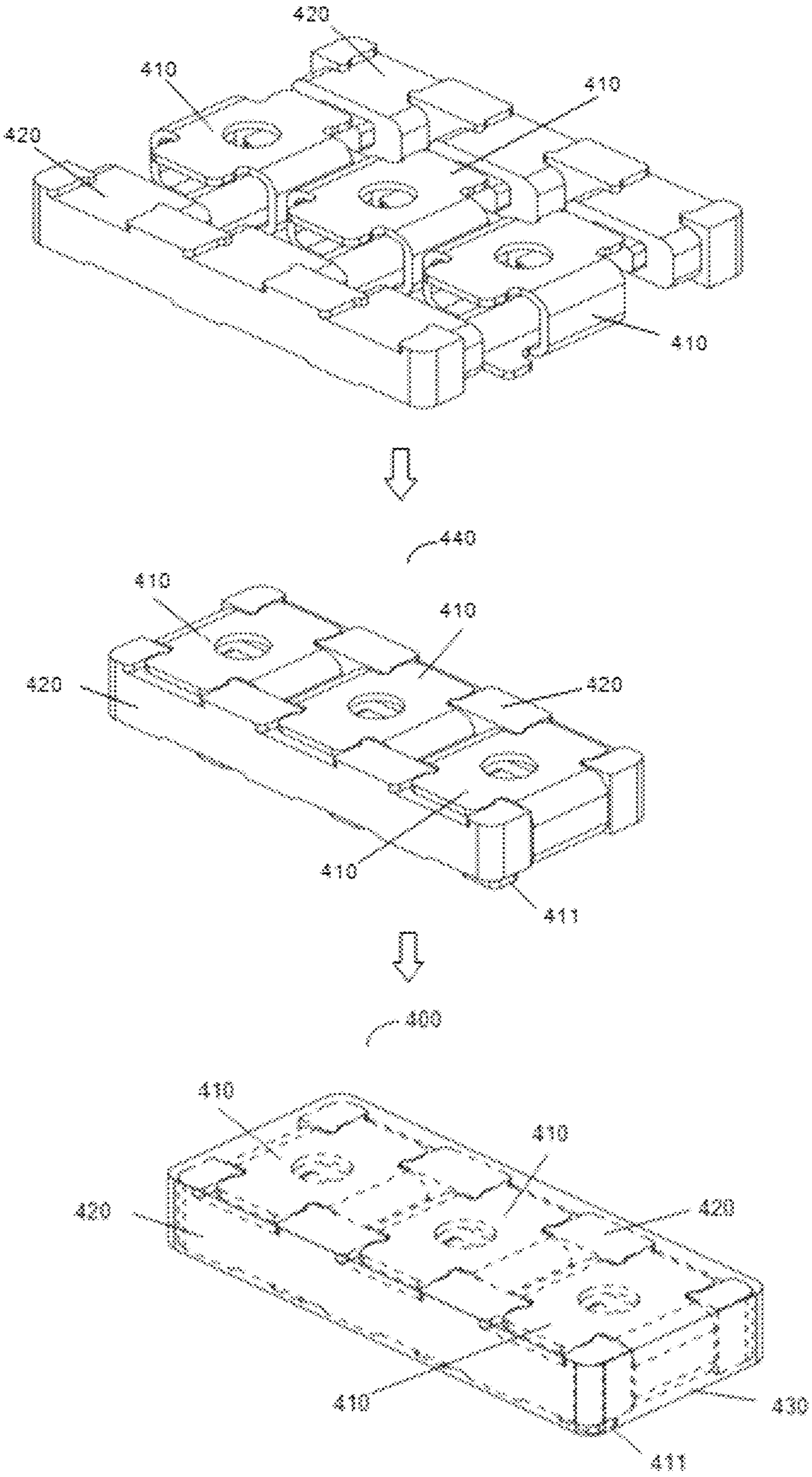
FIG. 4*d* is a schematic diagram of an assembly process of a linear inductor group 400 in embodiment 4 of the present application.
Figure 4E:
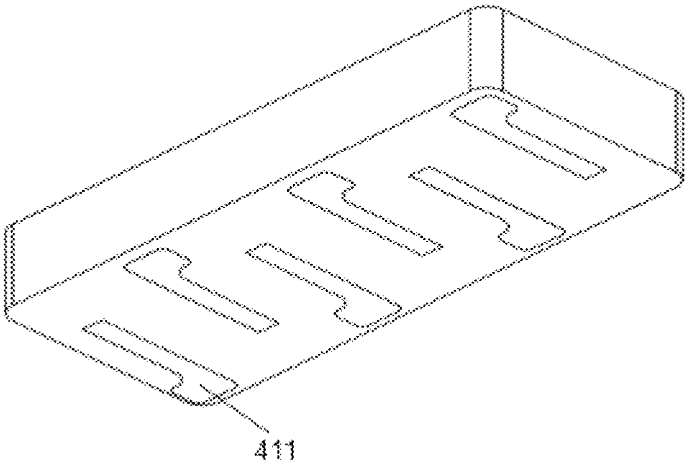
FIG. 4*e* is a structural schematic diagram of a nonlinear inductor row 400 from another perspective in embodiment 4 of the present application.

FIG. 4*d* shows a schematic diagram of an assembly process of the nonlinear inductance row 400. Three terminals 410 and two magnetic core assemblies 420 are clamped and fixed to form an assembly 440. The assembly 440 except for the electrode parts 411 of the terminal 410 is coated in the magnetic plastic encapsulation layer 430 by the injection molding technology, and after demolding and baking, a nonlinear inductor row 400 is finally obtained. FIG. 4*e* shows a structural schematic diagram of the nonlinear inductor row 400 from another perspective. The electrode parts 411 are shown outside the magnetic plastic encapsulation layer 430, and other parts are coated in the magnetic plastic encapsulation layer 430.

Embodiment 5

Embodiment 5 is a nonlinear inductor row, which is a multiphase stepped saturation molded inductor. As shown in FIGS. 5*a*-5*e*, the nonlinear inductor row includes two magnetic core assemblies 540, three terminals 410 in embodiment 4, and one magnetic plastic encapsulation layer 530. The magnetic core assemblies 540 include magnetic cores 510 and a T-shaped magnetic sheet 520.

Figure 5A:
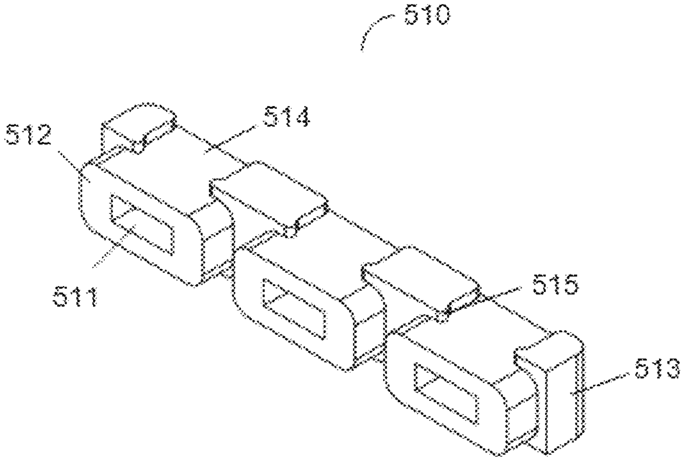
FIGS. 5*a*-5*b* are structural schematic diagrams of a magnetic core 510 in embodiment 5 of the present application.
Figure 5B:
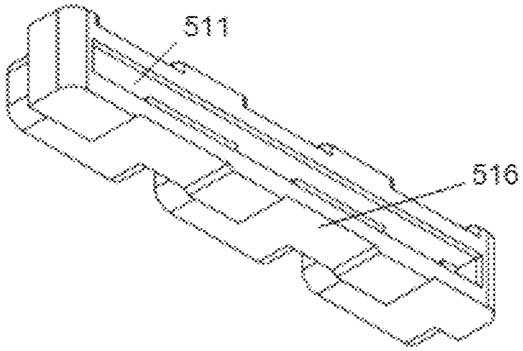
Figure 5C:
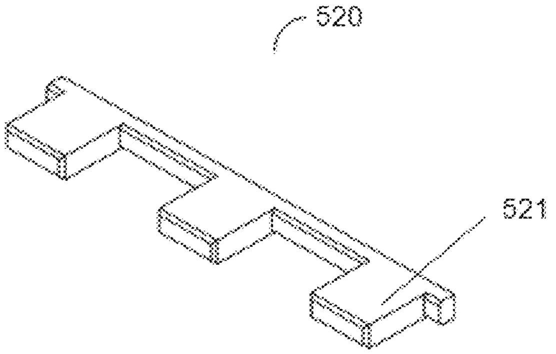
FIG. 5*c* is a structural schematic diagram of a T-shaped magnetic sheet 520 in embodiment 5 of the present application.
Figure 5D:
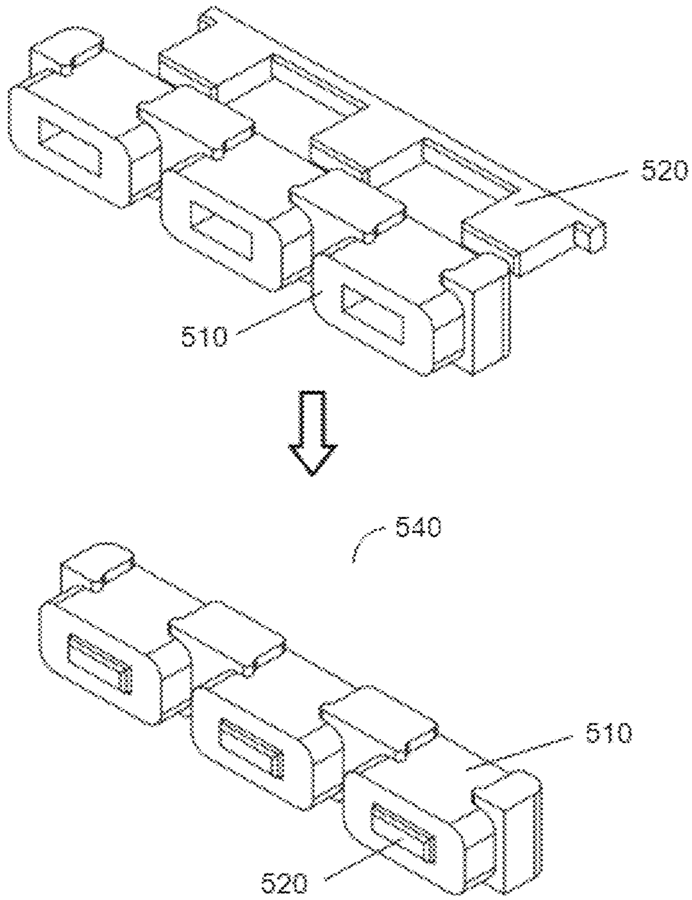
FIG. 5*d* is an assembly flow chart of a T-shaped magnetic sheet 520 and a magnetic core 510 in embodiment 5 of the present application.

FIGS. 5*a*-5*b* show structural schematic diagrams of the magnetic core 510. The magnetic core 510 is formed by sintering ferrite, which is similar to the magnetic core 320 of embodiment 3. The magnetic core 510 is provided with a multiphase T-shaped groove 511, and the multiphase T-shaped groove 511 penetrates through the central columns 512 (the number of the central columns 512 is at least 2, and is 3 in this example). FIG. 5*c* shows a structural schematic diagram of the T-shaped magnetic sheet 520. The T-shaped magnetic sheet 520 is formed by combining three T-shaped magnetic sheet units. The structure of each T-shaped magnetic sheet unit is the same as that of the T-shaped magnetic sheet 330 in embodiment 3. The T-shaped magnetic sheet 520 is inserted and fixed in the multiphase T-shaped groove 511 and the magnetic column 521 protrudes from the central columns 512. The number of the central columns 512 is the same as that of the magnetic column 521. In this example, as shown in FIG. 5*d*, which is an assembly process of the T-shaped magnetic sheet 520 and the magnetic core 510, the T-shaped magnetic sheet 520 and the magnetic core 510 may be assembled together by epoxy glue to form a magnetic core assembly 540. Referring to FIG. 5*a*, the top of the flange 513 of the magnetic core 510 is provided with a flange groove 514 for matching with the widened parts 413 on both sides of the top of the terminal, and both sides of the flange groove 514 are provided with bumps 515 for fixing the positions when the magnetic core assemblies 540 and the terminal 410 are assembled. The bottom of the flange 513 is provided with an electrode groove 516 for placing the electrode parts 411 of the terminal.

Figure 5E:
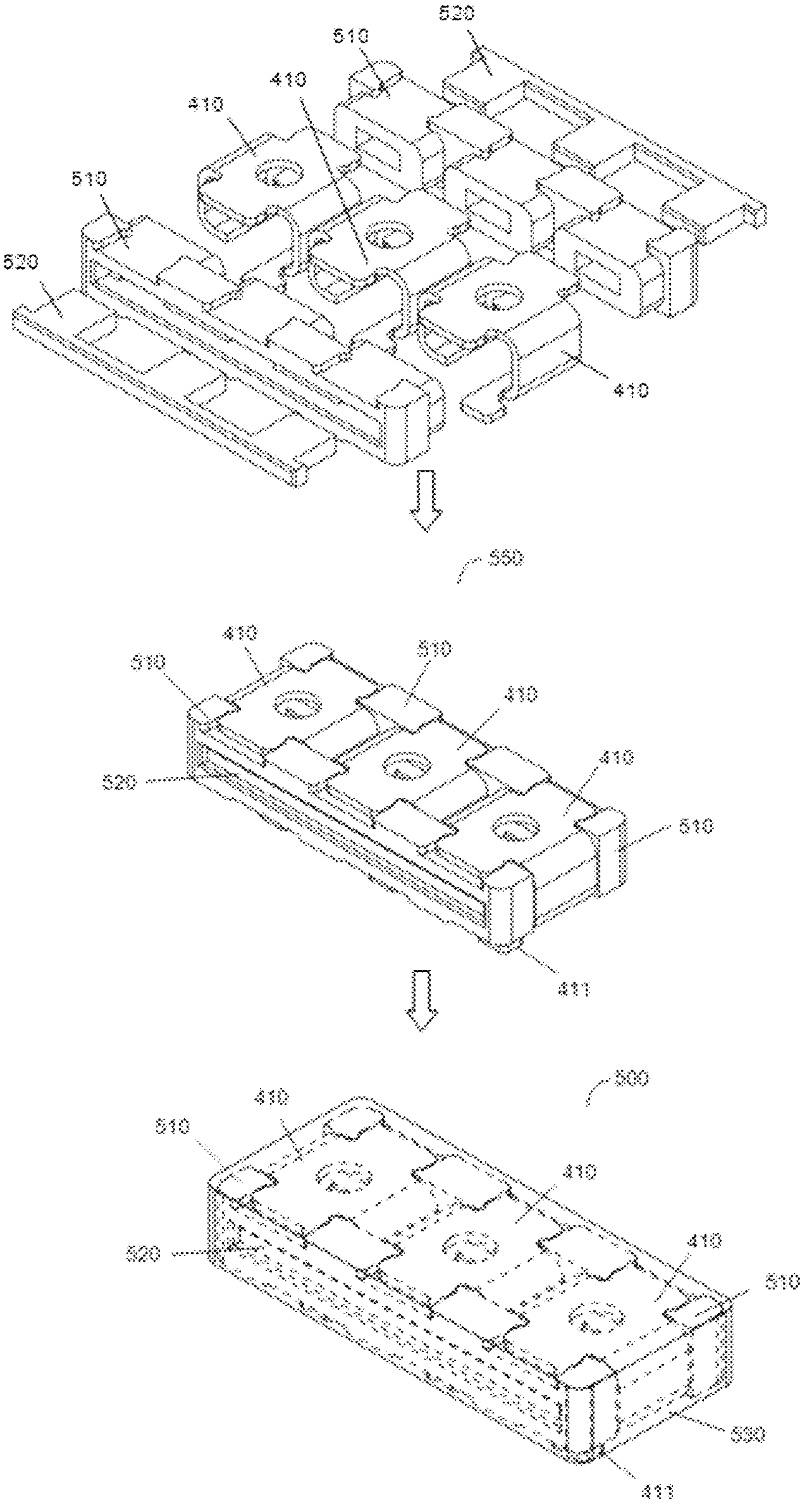
FIG. 5*e* is a schematic diagram of an assembly process of a nonlinear inductor row 500 in embodiment 5 of the present application.

FIG. 5*e* shows a schematic diagram of an assembly process of the nonlinear inductor row 500. The T-shaped magnetic sheet 520 and the magnetic core 510 are assembled through epoxy glue to form a magnetic core assembly 540. Two magnetic core assemblies 540 and three terminals 410 are clamped and fixed to form an assembly 550. The assembly 550 except for the electrode parts 411 of the terminal 410 is coated in the magnetic plastic encapsulation layer 530 by the injection molding technology. After demolding and baking, the nonlinear inductor row 500 is finally obtained. The electrode parts 411 are located outside the magnetic plastic encapsulation layer 530, and other parts are coated in the magnetic plastic encapsulation layer 530.

The background part of the present application may include background information about the problem or environment of the present application and is not necessarily the description of the prior art. Therefore, the content contained in the background part is not an admission of the prior art by the applicant.

The above contents are further detailed descriptions of the present application in combination with specific/preferred implementation. The specific implementation of the present application shall not be considered to be only limited to these descriptions. For those ordinary skilled in the art to which the present application belongs, several replacements or modifications may be made to these described embodiments without departing from the conception of the present application, and these replacements or modifications shall be considered to belong to the protection scope of the present application. In the illustration of this description, the illustration of reference terms "one embodiment", "some embodiments", "preferred embodiments", "example", "specific example" or "some examples", etc. means that specific features, structures, materials or characteristics illustrated in combination with the embodiment or example are included in at least one embodiment or example of the present application. In this description, exemplary statements for the above terms do not have to aim at the same embodiment or example. Moreover, the described specific features, structures, materials or characteristics can be combined appropriately in any one or more embodiments or examples. Those skilled in the art can combine and integrate different embodiments or examples and features of different embodiments or examples illustrated in this description without conflict. Although the embodiments and the advantages of the present application have been described in detail, it will be appreciated that various changes, replacements and variations can be made herein without departing from the protection scope of the patent application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A nonlinear inductor, comprising two magnetic core assemblies, a conductor and a magnetic plastic encapsulation layer, wherein the magnetic core assemblies comprise magnetic cores; each magnetic core comprises a flange and a central column arranged on the flange; two central columns of the two magnetic core assemblies are opposite to each other; a non-uniform air gap exists between the two central columns and/or the magnetic core assemblies are made of different materials; the conductor is arranged on the two central columns; the two magnetic core assemblies and the conductor are located in the magnetic plastic encapsulation layer; electrode parts of the conductor are exposed outside the magnetic plastic encapsulation layer; and the magnetic core assemblies and the magnetic plastic encapsulation layer are made of different materials; thereby the nonlinear inductor has stepped saturation characteristics.

2. The nonlinear inductor of claim 1, wherein each magnetic core assembly further comprises a lug boss; the lug boss is arranged on the central column; and steps are arranged between the flange and the central column and between the lug boss and the central column.

3. The nonlinear inductor of claim 1, wherein each magnetic core assembly further comprises a magnetic rod; the magnetic core has a groove; the magnetic rod is fixed in the groove; and the materials of the magnetic rod and the magnetic core are different.

4. The nonlinear inductor of claim 1, wherein each magnetic core assembly further comprises a T-shaped magnetic sheet; the magnetic core has a T-shaped groove; the shape of the T-shaped groove is matched with the T-shaped groove; the T-shaped groove passes through the central column and the flange; the T-shaped magnetic sheet is fixed in the T-shaped groove; and the materials of the T-shaped magnetic sheet and the magnetic core are different.

5. The nonlinear inductor of claim 1, wherein the conductor is a hollow coil which comprises a coil body and electrode parts respectively arranged at both ends of the coil body; and the coil body is fixed on the central columns of the two magnetic cores.

6. The nonlinear inductor of claim 2, wherein the conductor is a hollow coil which comprises a coil body and electrode parts respectively arranged at both ends of the coil body; and the coil body is fixed on the central columns of the two magnetic cores.

7. The nonlinear inductor of claim 3, wherein the conductor is a hollow coil which comprises a coil body and electrode parts respectively arranged at both ends of the coil body; and the coil body is fixed on the central columns of the two magnetic cores.

8. The nonlinear inductor of claim 4, wherein the conductor is a hollow coil which comprises a coil body and electrode parts respectively arranged at both ends of the coil body; and the coil body is fixed on the central columns of the two magnetic cores.

9. The nonlinear inductor of claim 1, wherein the conductor is a metal terminal which comprises a base part, two bent parts connected with the base part, two electrode parts connected with the two bent parts respectively, and two widened parts connected with the base part; each of the two bent parts extends downward from two opposite sides of the base part; the two electrode parts are respectively arranged at one end of the two bent parts away from the base part; each of the two widened parts extends outwards from other two opposite sides of the base part and is flush with the base part; the middle region of the base part is further provided with a terminal hole;

the top of the flange has a flange groove for matching the widened parts; and the bottom of the flange has an electrode groove for placing the electrode parts.

10. The nonlinear inductor of claim 2, wherein the conductor is a metal terminal which comprises a base part, two bent parts connected with the base part, two electrode parts connected with the two bent parts respectively, and two widened parts connected with the base part; each of the two bent parts extends downward from two opposite sides of the base part; the two electrode parts are respectively arranged at one end of the two bent parts away from the base part; each of the two widened parts extends outwards from other two opposite sides of the base part and is flush with the base part; the middle region of the base part is further provided with a terminal hole;

the top of the flange has a flange groove for matching the widened parts; and the bottom of the flange has an electrode groove for placing the electrode parts.

11. The nonlinear inductor of claim 3, wherein the conductor is a metal terminal which comprises a base part, two bent parts connected with the base part, two electrode parts connected with the two bent parts respectively, and two widened parts connected with the base part; each of the two bent parts extends downward from two opposite sides of the base part; the two electrode parts are respectively arranged at one end of the two bent parts away from the base part; each of the two widened parts extends outwards from other two opposite sides of the base part and is flush with the base part; the middle region of the base part is further provided with a terminal hole;

the top of the flange has a flange groove for matching the widened parts; and the bottom of the flange has an electrode groove for placing the electrode parts.

12. The nonlinear inductor of claim 4, wherein the conductor is a metal terminal which comprises a base part, two bent parts connected with the base part, two electrode parts connected with the two bent parts respectively, and two widened parts connected with the base part; each of the two bent parts extends downward from two opposite sides of the base part; the two electrode parts are respectively arranged at one end of the two bent parts away from the base part; each of the two widened parts extends outwards from other two opposite sides of the base part and is flush with the base part; the middle region of the base part is further provided with a terminal hole;

the top of the flange has a flange groove for matching the widened parts; and the bottom of the flange has an electrode groove for placing the electrode parts.

13. The nonlinear inductor of claim 9, wherein both sides of the widened parts are further provided with first clamping parts; both sides of the flange groove are provided with second clamping parts matched with the first clamping parts; one of the first clamping parts and the second clamping parts is a clamping groove, and the other is a bump; and the metal terminal and the magnetic cores are fixed through matching and clamping of the first clamping parts and the second clamping parts.

14. The nonlinear inductor of claim 9, wherein the metal terminal is integrally formed from red copper plates by stamping, electroplating, cutting and bending.

15. A manufacturing method of the nonlinear inductor of claim 1, comprising the following steps:

S1, assembling two magnetic core assemblies and a conductor to form an assembly;

S2, coating the assembly with a magnetic material through a compression molding technology, and exposing the electrode parts of the conductor;

S3, under preset molding pressure and preset baking temperature, solidifying the magnetic material to form a magnetic plastic encapsulation layer, so as to coat the two magnetic core assemblies and parts of the conductor except for the electrode parts into the magnetic plastic encapsulation layer and expose the electrode parts of the conductor outside the magnetic plastic encapsulation layer.

16. A nonlinear inductor row formed by combining the nonlinear inductors of claim 1.

* * * * *